(12) United States Patent
Berry

(10) Patent No.: X7462
(45) Date of Patent: Mar. 6, 1833

(54) HIDES, SOFTENING

(76) Inventor: Willis Berry

Willis Berry. of New Sharon. State of Maine -

Letters Patent.

The schedule referred to in these Letters Patent and making part of the same containing a description in the words of the said Willis Berry himself of his improvement in the mode of softening hides for Tanning To all to whom these presents shall come Be it known that I, Willis Berry of New Sharon in the County of Kennebec and State of Maine, have invented a new and useful improvement, in ("softening hides for tanning") and that the following is a full and exact description to wit.

Prepare a vat that will hold twenty five dry sole leather hides then fill it with water so that by putting in the hides it will be full, then take one half bushel of slacked lime one half bushel of good ashes twelve pounds of potash dissolved in water five pounds of oil of vitriol and four pounds of the Spirits of Salts, and put them all into the vat & stir them well, Then put in the hides, and let them remain from three to four days, then take them out and split them, if they are not now soft enough to put them into the lime vat, return them and let them remain till they are sufficiently soft, then prepare another vat, put in one bushel of slaked lime & one bushel of good ashes and four pounds of potash dissolved, and stir them well together. Then take the hides and put them into this vat - draw them every other day till they are sufficiently raised, and the hair begins to start which will require about six or seven days, then prepare another vat, with good "lime liquor" then put the hides into this "liquor" & draw them every other day, till they are in a fit state to "unhair", then unhair them, then return them to the second vat one day afterwards flesh them - The next day work them on the grain - then they are ready for bark.

Handle them in good bark liquor till they are well coloured then lay them away and proceed as usual, The mode of softening upper leather hides and calf skins is as follows
to wit, put them into the first mentioned vat after the sole leather
is taken out — if these hides are dry & hard, six pounds of potash
dissolved in water, two pounds of oil vitriol & two pounds of the spirit
of salts may be added: let them remain three or four days, then draw
and split them. Then return them and draw them every other day till
they are fit to "go to lime". Then proceed as usual. — Feby 11th 1833

Witnesses

Ex.d
Ch.J.N.

Hiram Belcher
Saml. D. Townsend

Willis Berry

515 [illegible]